Dec. 13, 1927.

N. H. CROUSE 1,652,766

ROLLER AND LIKE BEARING

Filed June 16, 1926

INVENTOR.
NATHAN H. CROUSE.
BY
ATTORNEY.

Patented Dec. 13, 1927.

1,652,766

UNITED STATES PATENT OFFICE.

NATHAN H. CROUSE, OF AKRON, OHIO, ASSIGNOR OF ONE-HALF TO OSCAR HAYES, OF AKRON, OHIO.

ROLLER AND LIKE BEARING.

Application filed June 16, 1926. Serial No. 116,347.

This invention relates to roller bearings.

The general purpose of the invention is to provide a roller bearing suitable for use in shafts in damp or exposed positions or under water, and particularly for ship propeller shafts, centrifugal pumps, and mining machinery.

In this class of machinery it is very difficult to secure or maintain lubrication with any oil or grease. Expensive non-corrodible bearings have been employed and the bearings are often impaired or destroyed by friction of grit, sediment and the like carried by the water.

It has heretofore been proposed to provide a grooved sleeve bearing of rubber and means for supplying water thereto. The present invention contemplates securing the advantages of this type of bearing, as to lubrication and resistance to grit, and further the advantages of the roller bearing, as to reduced friction together with greater ease in supplying the lubricant to the bearing.

The invention in its preferred form is directed to roller bearings of tough, resilient, waterproof material, such as vulcanized rubber which can readily be lubricated with water, are non-corrodible and are resistant to friction of grit thereon, whereby an inexpensive but effective bearing is provided for the uses above set forth, and one which, due to the flexible resilient nature of the rubber, will equalize the pressure over the entire bearing.

The foregoing and other objects are obtained by the bearing construction illustrated in the accompanying drawings and described below. It is to be understood that the invention is not limited to the specific form thereof disclosed herein.

Of the accompanying drawings.

Figure 1:
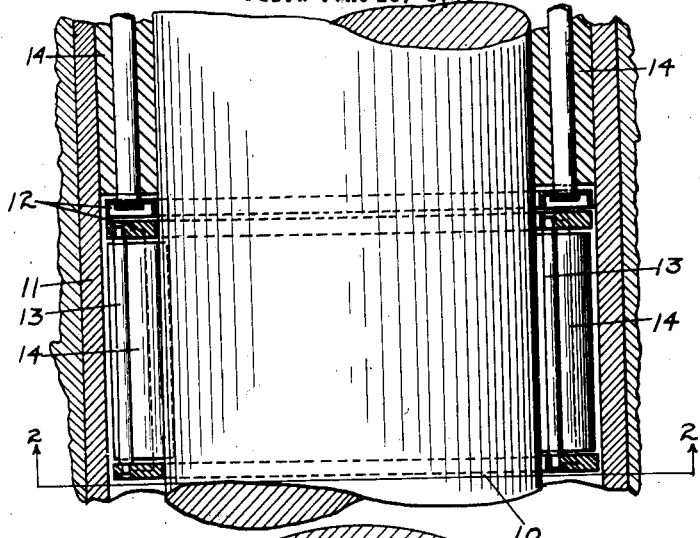
Figure 1 is a longitudinal section through a shaft bearing embodying the invention.
Figure 2:
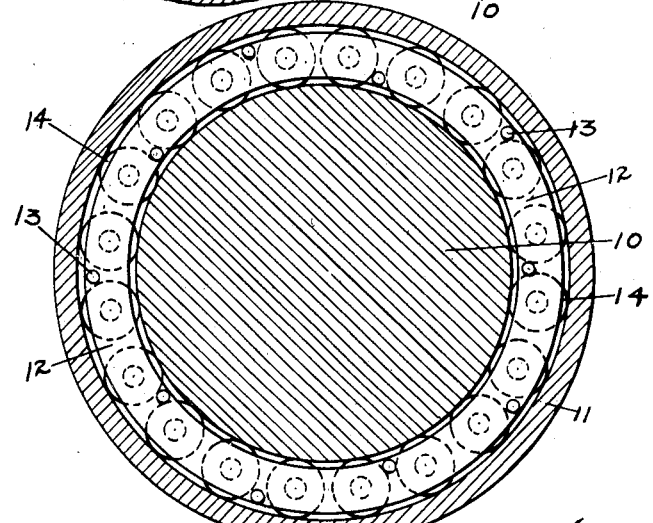
Figure 2 is a section on line 2—2 of Figure 1.

Referring to the drawings, 10 illustrates a shaft which may be, for example, the propeller shaft for a ship. The numeral 11 indicates a race of any suitable construction, and 12, 12 indicate cage rings, connected by cage rods 13, 13 and in which rings are journaled vulcanized rubber rollers 14, 14, each of which include a central metallic shaft onto which the body portion of rubber has been permanently vulcanized according to known methods.

In order to support the load properly in an installation, it is desirable that the rollers be under compression between the shaft and the race so that pressure will be equalized, i. e. the shaft will be held true to its center and allowable working pressure of the bearing with additional pressure for safety will be provided.

Figure 3:
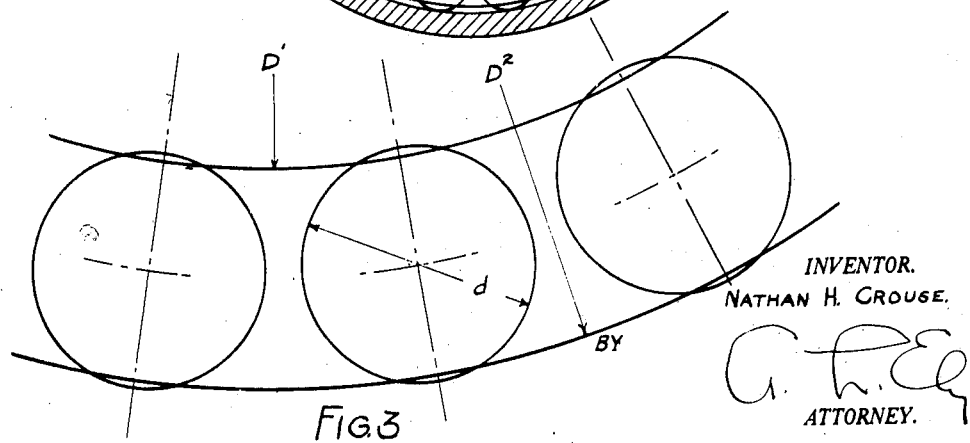
Figure 3 is a view of a construction drawing illustrating the general relationship between the diameter of the shaft, the diameter of the race and the normal diameter of the rollers.

As illustrated in Figure 3, the normal diameter of the rollers is preferably larger than one half the difference between the diameter $D^1$ of the shaft and the inner diameter $D^2$ of the race by an amount depending upon the character of the rubber and the load on the bearings in any particular installation. For certain installations, softer and less resilient rubber may be employed, while for others, tougher and more resilient rubber may be required, depending upon the requirements of the particular installation. These conditions can be met by proper compounding of the rubber by skilled artisans.

The roller cage rings 12 are preferably of steel and, for certain classes of work where a large amount of grit is present in the water, are preferably coated with rubber as by electrodeposition. The cage rings 12 may be of the various forms shown in the drawings, or in other suitable forms, being so designed as not to allow sand or grit to lodge permanently thereon.

In use, it is to be understood, free access of water to and around the rollers 14 is permitted. This is easily accomplished in the case of ship propeller shafts since water from the river, lake or sea may be permitted to pass about the bearing. In the case of other machinery, suitable means may be provided to supply water to the bearing. It will be observed that, due to the roller bearing construction, the water serving as lubricant can pass freely over all bearing surfaces.

The rolling friction on the rubber is such that it is subjected to a heavy kneading action tending to keep the rubber "alive" i. e. highly resilient for a long period of time, the maintenance of water all over the surfaces of the rollers also preventing deterioration by action of oxygen and heat, the water serving as a protecting and cooling medium as well as serving as a lubricant.

Modifications of the invention may be resorted to without departing from the spirit thereof or the scope of the appended claims.

What is claimed is:

1. A bearing constructed to be freely lubricated with water and comprising a race, a cage, and rollers journaled in the cage, each of said rollers comprising a core shaft of metal and a body portion of tough, resilient rubber vulcanized thereto, all of said rollers being mounted under compression.

2. A bearing constructed to be freely lubricated with water and comprising a race, and elements rolling thereon, said elements being of tough, resilient rubber and all of said elements being mounted under compression.

3. A bearing constructed to be freely lubricated with water and comprising a race, a cage, and rollers journaled in the cage, each of said rollers comprising a body portion of tough, resilient rubber, all of said rollers being mounted under compression.

NATHAN H. CROUSE.